2,903,425

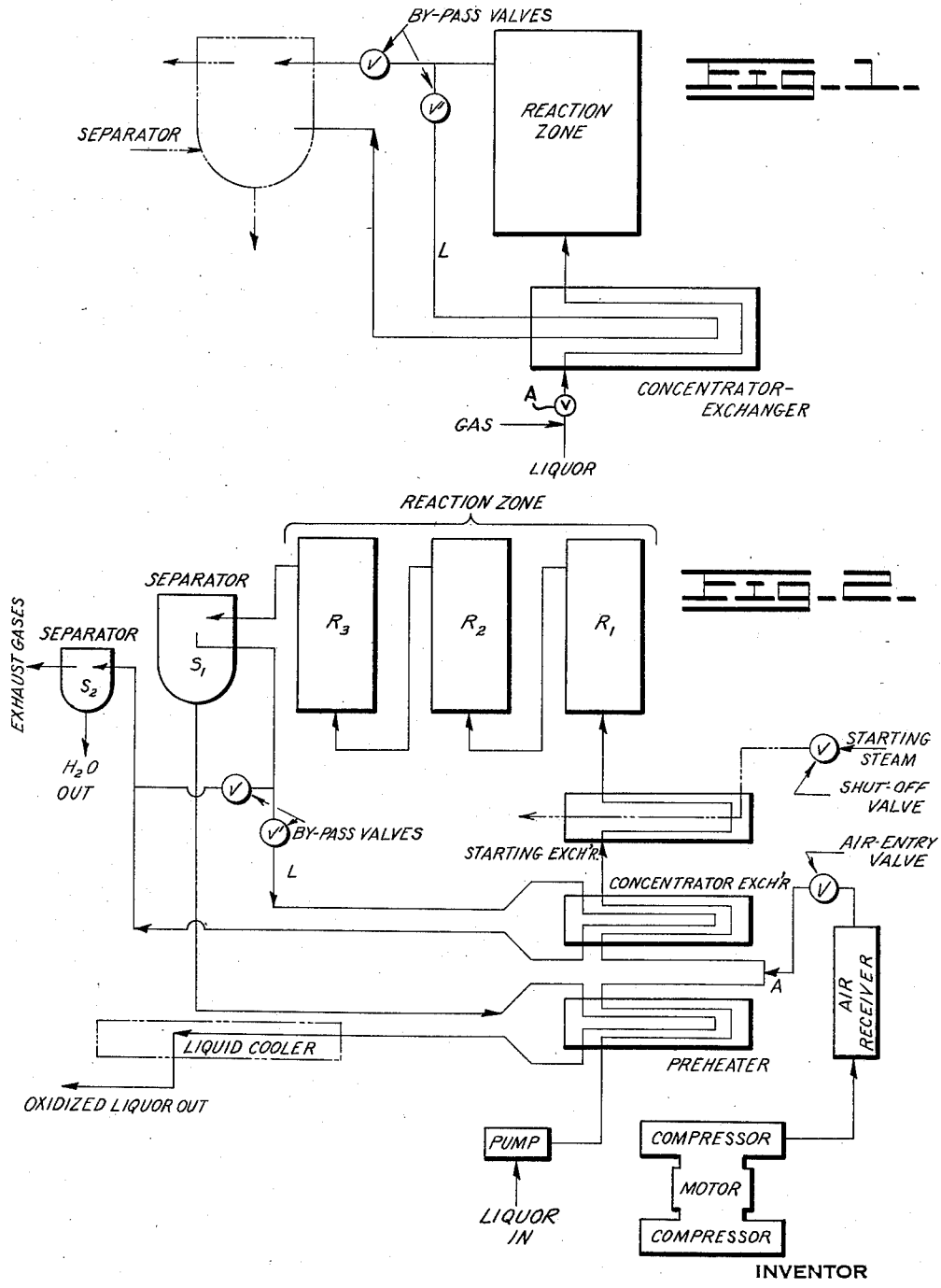

OXIDATION REGULATION

Frederick J. Zimmermann, Marathon County, Wis.

Application January 24, 1955, Serial No. 483,504

2 Claims. (Cl. 210—63)

This invention is directed to a control method for an autogenetic oxidation process wherein combustible materials in aqueous dispersion are substantially completely oxidized in the presence of a free oxygen-containing gas to yield steam, water, non-condensible gases and inorganic salts or ash. The invention is specifically concerned with a control apparatus and method for such a self-sustaining oxygenating process wherein the rate of oxidation is regulated by the adjustment of the concentration of the introduced combustible liquor in aqueous dispersion and which concentration is in turn accomplished by the thermal conditions selected for the input of combustible material.

In United States Letters Patent 2,665,249 there is disclosed an autogenetic oxidation process which has attained considerable commercial significance in its treatment of industrial wastes such as sewage, waste sulfite liquors, cheese wastes, and other organic and carbonaceous "wastes." However, commercial extension has demanded that regulation methods and controls be adopted to suit the process to varying sources and to adjust the heat balance of the process to provide a steady and maximum amount of heat above the process demands. In an attempt to accomplish such adjustment or control, it was thought desirable to preheat the incoming liquor. In this manner, it was thought that since the reaction time was inversely proportional to the concentration of the liquor, maximum requirements demanded only the heating of the liquor to obtain the highest possible preheating temperatures of the liquor. However, excessive heating of the liquor was found to cause a "gunking" or solidification of the flowing liquor and the continuousness of the process was temporarily destroyed by a solid or semi-solid mass. This mass of "gunked" obstruction was composed of ash, inorganic salts, insoluble material at the desired concentration and non-volatile oxidation products. When such an unbalance in the system occurred, the continuousness of the process was interrupted. Therefore, a means for regulating the flow conditions to avoid such interruption was sought. Such regulation was imperative if the process was to be applied to large power producing installations utilizing materials varying in composition and heat content.

It has been found experimentally that a minimum of about 3000 British thermal units per gallon of liquor were required at the entry to the reaction zone to maintain self-sustaining conditions at about 800 pounds per square inch gauge pressure. Thus, a combustible feed material having substantially less than 3000 British thermal units per gallon at the reactor entry would not provide sufficient heat potential to maintain the continuous character of the reaction process, without externally-applied heat. Oxidation at lower concentrations was observed but such condition appeared outside of any practical time and apparatus limits. Preferred inlet concentration condition at the reactor is about 7000 British thermal units per gallon.

The present invention relates, therefore, to a method and apparatus means for adjusting the concentration in terms of combustible material to water between the extreme conditions indicated above.

It has now been found that a control for this process may be provided by leading at least a part of the effluent from the oxidation reactor in a heat exchange relationship with the influent liquor. Necessarily, a quantity of gas in excess of that which may be absorbed must be present in the liquor in order that evaporation may occur. This is readily accomplished by introducing a quantity of gas in excess of that which may be absorbed prior to establishing the indicated heat exchange.

A heat concentrator-exchanger through which the incoming raw liquor is passed in the presence of a gas prior to the entry of the organic waste material to the reactor is provided. This concentrator-exchanger is connected with the effluent in a heat exchange relationship in order that at least a part of the effluent is passed through the concentrator-exchanger to cause heating and concentration of the influent liquor in the presence of the gas. Conveniently, some kind of a separator for the reactor effluent, a valved by-pass, or a similar arrangement is provided which will allow at least a part of the reactor effluent to be utilized for concentration by heat exchange with the reactor influent. The amount of reactor effluent so used will be a controlled amount in order that the reactor influent will contain the desired British thermal units, but will not "gunk" up.

Under these conditions the temperature of the incoming liquor was elevated and concentration occurred by reason of evaporation. The minimum temperature for preheat before admission to the reactor was determined to be about 280 degrees Fahrenheit. At this condition sufficient British thermal units were observed in the fuel dispersed in water to maintain the reaction at a substantially constant temperature and pressure. The maximum admission temperature was determined by the point at which "gunking" or solidification of the organic material occurred inside the system. In short, the fuel value in British thermal units per unit volume was increased prior to introduction to the reactor. By altering the partial pressure conditions within the concentrator-exchanger, the concentration of the incoming material could be changed as desired. In this process it is assumed that sufficient air or other gas space is provided to make the amount of water evaporated dependent only on the amount of reactor effluent-heat-exchanged with input liquor. By controlling the amount of heat moving from the reactor to the concentrator-exchanger the concentrating effect can be delicately adjusted.

Actual control can be readily accomplished through means of a valved by-pass conduit leading from the reactor to the heat concentrator-exchanger. As the concentration varies in the incoming liquor the manipulation of the by-pass valve causes either more or less diversion of reactor effluent material away from or into the heat concentrator-exchanger unit. From another point of view a given reactor plant may thus be adapted to vary in capacity and to adjust itself to varying concentrations of combustible materials in aqueous dispersion.

While a valved by-pass has been used to specifically show the manner in which the present invention is accomplished, it is to be understood that other arrangements are within the scope thereof. For example, a separator may be provided which will receive all or a part of the effluent from the reactor. Where a liquor having a high fuel factor (British thermal unit content per unit volume) is used as input, excess heat as high temperature gases may be used for other purposes, while the liquid or slurry from the separator would be used for the concentrator-exchanger. Alternatively, the high temperature gases could be used to concentrate, or, a mixture of gases and liquid slurry, or a part of either, could be used. Also within the scope of the present invention are multiple stage separators and exchangers, wherein one piece of equipment performs only a part of the regulation. In any event, the system which is employed should be capable of enough adjustment to obtain a degree of control which will maintain the reactor input between at least 3000 British thermal units per gallon and that concentration at which "gunking" occurs.

To illustrate the operation of the present invention the following examples show the operation of the by-pass to cause an increase or decrease in concentration of combustibles to water in specific types of industrial organic material. It is to be understood, however, that the following examples are not to be construed as limiting.

Example 1

Using the apparatus illustrated schematically in the attached drawing at Figure 2, the preheat exchanger accomplished elevation of the incoming liquor from storage temperature to about 170 Fahrenheit degrees under a pressure of about 850 pounds per square inch. Air was admitted after the preheat exchanger and prior to the concentrator-exchanger and introduction of the organic-aqueous dispersion and gas into the reaction zone established by the three reactors shown (Figure 2). The temperature was elevated in the system maintained at about 810 pounds per square inch pressure to about 418 degrees Fahrenheit. This temperature was attained prior to entry of the waste material into the reactor utilizing the steam obtained from the separator S circulated by means of the by-pass, in heat exchange relation against the continuously moving waste liquor. The temperature within the reaction zone, represented by the reactors shown as $R_1$, $R_2$, and $R_3$ (in Figure 2) indicated a maximum temperature of about 493 degrees Fahrenheit at a pressure of about 800 pounds per square inch gauge. Using a fuel having a known British thermal unit content of about 5600 B.t.u.'s per gallon, a continuous run operated with no appreciable "gunking" or plugging of the apparatus, yet sufficient effluent heat was present to accomplish the preheat with an excess for other uses. The material used as the raw liquor was sodium base semi-chemical pulping liquor. This material was selected because it constitutes one of a group of organic waste liquors requiring commercial treatment. Analysis of the concentration of material at entry to the first reactor revealed approximately 6860 British thermal units per gallon.

Example 2

The same apparatus employed in Example 1, and best illustrated in Figure 2, was used and where excessive heat (450 degrees Fahrenheit) was applied by means of the by-pass to the concentrator-exchanger and where the same sodium base semi-chemical fuel having a British thermal unit fuel value of about 5600 per gallon was used, excessive concentration occurred and "gunking" was observed at the entry to the reactor interrupting the continuousness of the reaction process. The observed fuel concentration per gallon at the entry to the first reactor was about 8500 British thermal units.

Example 3

Utilizing the apparatus of Examples 1 and 2, a sodium base semi-chemical pulping liquor fuel having a British thermal unit content of about 3400 per American gallon, sufficient concentration was accomplished in the equipment utilizing open by-pass. The by-pass was fully opened by means of opening the by-pass valve illustrated. Concentration at the entry to the reaction zone was estimated at about 5000 British thermal units per American gallon and suitable liquid phase combustion was maintained in the reaction zone.

Referring more particularly to the drawing, Figure 1 is a schematic flow diagram showing a concentrator-exchanger, and a reaction zone with the effluent therefrom directly serving the concentrator-exchanger and providing a regulatable heat source. A separator is shown in phantom line as it is not absolutely required in the regulatory system. The by-pass valves V and V' illustrated provide metered control of the reactor effluent to the concentrator-exchanger. Appropriate conduits are clearly indicated. The by-pass lines are indicated as such on the drawing. In Figure 2, illustrating an operating plant, raw waste material having a given concentration of British thermal units per unit volume is pumped into and through a series of heat exchangers wherein the heat of the raw liquor is gradually elevated to reach the desired autogenetic conditions for continuous introduction to the reactors. In progressive sequence these exchangers are the preheater, the concentrator-exchanger where concentration occurs, and the starting exchanger. The starting exchanger is used only to start the reactors and when self-sustaining conditions are obtained the starting steam is shut off. Substantially complete oxidation occurs in the reactors $R_1$, $R_2$, and $R_3$, the reaction products such as carbon dioxide, nitrogen, excess oxygen, steam, and ash material and water leave the reactor or reaction zone and suitable separation thereof is subsequently accomplished as indicated in separators $S_1$ and $S_2$. Some of the reactor effluent is cycled via conduit L from the separator at the temperature obtained within the reaction zone less radiation loss and is directed to the concentrator-exchanger and preheaters or exchangers as necessary. Figure 2 also shows use of both liquid and gaseous components of the reactor effluent for heating. Prior to the movement of the preheated waste combustible material into the reaction zone, air is pumped into and mingles with the flowing waste organic material. In both Figures 1 and 2, the air entry port is shown at A. This produces a condition within the concentrator-exchanger so that a concentrating effect is observed dependent upon the adjustment of temperature of the materials flowing through the by-pass and conduit L into the concentrator-exchanger. A continuous evaporation occurs therein which alters the concentration of the flowing waste organic material in aqueous dispersion prior to introduction into the reaction zone.

The present application is a continuation-in-part of my copending application for United States Letters Patent Serial Number 397,959, filed on December 14, 1953, now Patent No. 2,824,058, which application is a continuation-in-part of my application Serial Number 152,264, filed on March 27, 1950, and now United States Letters Patent 2,665,249, issued on January 5, 1954, which application was a continuation-in-part of my application Serial Number 118,834, filed September 30, 1949, now abandoned, and which application was in turn a continuation-in-part of my application Serial Number 618,065, filed on September 22, 1945, now abandoned.

It will thus be seen that a regulatory process and apparatus has been provided in self-sustaining oxidation processes which is beneficial in the art and renders the plant readily adaptable to changes in the fuel material reflected in various demand conditions due to shifts in the volume energy content in British thermal units.

Having thus described my invention it will be understood that other modifications within the skill of the art are intended to be included in the hereinafter appended claims, unless the language of the claims negative such inclusion.

I claim:

1. In a continuous process for the liquid phase autogenetic oxidation of combustible materials, the steps which comprise: mixing with an aqueous dispersion of a combustible material an oxygenating gas in excess of that amount which will absorb in said dispersions; passing said gas-aqueous mixture in heat exchange relationship with at least a portion of hot fluid effluent from a reaction zone to concentrate said mixture by evaporation of water therefrom but maintaining the so-evaporated water in stream with said concentrate; introducing said concentrated mixture and vaporous evaporate into a reaction zone; autogenetically oxidizing the combustible material in said concentrate in said reaction zone; venting hot fluid effluent from said reaction zone in a ratio such that water in the form of vapor is withdrawn from the reaction zone at a rate to maintain the concentration of combustibles within the reaction zone above about 3000 British thermal units fuel value per gallon; and proportionally controlling the flow ratio of said hot fluid effluent passed in said heat exchange relationship to produce a feed for said reaction zone wherein the combustible to liquid water ratio is in a range such that the oxidation reaction will be self-sustaining, but less than that which will interrupt the continuous nature of the process.

2. In a process for the liquid phase autogenetic oxidation of combustible materials, the steps which comprise: mixing with an aqueous dispersion of a combustible material an oxygenating gas in excess of that amount which will absorb in said dispersion; passing said gas-aqueous mixture in heat exchange relationship with at least a portion of hot fluid effluent from a reaction zone to concentrate said mixture by evaporation of water therefrom but maintaining the so-evaporated water in stream with said concentrate; introducing said concentrated mixture and vaporous evaporate into a reaction zone; autogenetically oxidizing the combustible material in said concentrate in said reaction zone; venting hot fluid effluent containing water vapor from said reaction zone in a ratio to that introduced to maintain the concentration within the reaction zone constant; and proportionately controlling the flow ratio of said hot fluid effluent passed in said heat exchange relationship to produce a feed for said reaction zone wherein the British thermal units per gallon fuel value is at least 3000, but below that point at which interruption of the continuous nature of the process occurs.

References Cited in the file of this patent

UNITED STATES PATENTS

| | | |
|---|---|---|
| 1,149,420 | Strehlenert | Aug. 10, 1915 |
| 1,268,774 | Sorass | June 4, 1918 |
| 2,039,444 | Oman et al. | May 5, 1936 |
| 2,191,712 | Greenwalt | Feb. 27, 1940 |
| 2,213,052 | Rosencrants et al. | Aug. 27, 1940 |
| 2,258,401 | Badenhausen | Oct. 7, 1941 |
| 2,665,249 | Zimmerman | Jan. 5, 1954 |
| 2,773,026 | Cederquist | Dec. 4, 1956 |